(12) United States Patent
Willke, II

(10) Patent No.: US 6,625,696 B1
(45) Date of Patent: Sep. 23, 2003

(54) METHOD AND APPARATUS TO ADAPTIVELY PREDICT DATA QUANTITIES FOR CACHING

(75) Inventor: Theodore L. Willke, II, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,861

(22) Filed: Mar. 31, 2000

(51) Int. Cl.$^7$ .............................................. G06F 12/00
(52) U.S. Cl. ..................... 711/137; 711/204; 711/213
(58) Field of Search ................. 711/137, 204, 711/213

(56) References Cited

U.S. PATENT DOCUMENTS

| | | | | | |
|---|---|---|---|---|---|
| 5,146,578 A | * | 9/1992 | Zangenehpour | .............. | 711/137 |
| 5,778,436 A | * | 7/1998 | Kedem et al. | .............. | 711/137 |
| 5,815,662 A | * | 9/1998 | Ong | .............. | 365/230.01 |
| 5,838,945 A | * | 11/1998 | Emberson | .............. | 712/200 |
| 6,003,115 A | * | 12/1999 | Spear et al. | .............. | 711/113 |
| 6,012,106 A | * | 1/2000 | Schumann et al. | ........... | 710/22 |
| 6,134,643 A | * | 10/2000 | Kedem et al. | .............. | 711/137 |
| 6,195,735 B1 | * | 2/2001 | Krueger et al. | .............. | 711/137 |
| 6,311,260 B1 | * | 10/2001 | Stone et al. | .............. | 711/137 |
| 6,321,312 B1 | * | 11/2001 | Davis et al. | .............. | 711/137 |
| 6,381,554 B1 | * | 4/2002 | Matsuo et al. | .............. | 702/174 |

OTHER PUBLICATIONS

Chen et al., "A Performance Study of Software and Hardware Data Prefetching Schemes," pp 223–232. IEEE, 1994.*
Saavedra et al., "Improving the Effectiveness of Software Prefetching With Adaptive Execution," pp 68–78. IEEE, 1996.*

* cited by examiner

Primary Examiner—Matthew Kim
Assistant Examiner—Stephen Elmore
(74) Attorney, Agent, or Firm—Blakely, Sokoloff, Taylor & Zafman LLP (57) ABSTRACT

An apparatus and method for predicting quantities of data that will be requested by requesting devices capable of initiating requests for data from storage devices, in which prediction of quantities that will be requested are made based on past patterns of quantities of data requested.

22 Claims, 5 Drawing Sheets

METHOD AND APPARATUS TO ADAPTIVELY PREDICT DATA QUANTITIES FOR CACHING

FIELD OF THE INVENTION

The present invention is related to a method and apparatus for adaptively caching data for peripheral devices capable of initiating requests for data from a storage device.

ART BACKGROUND

Computer systems commonly have one or more storage devices, devices requiring large quantities of data from storage devices, and busses that can be used to transfer data from storage devices to other devices. Commonly used storage devices such as dynamic random access memory (DRAM) and various forms of disk drives impose considerable latencies on each access made to either read or write data.

A common approach to overcoming these latencies is the use of a cache system, a smaller, but much faster storage device. Cache systems attempt to reduce latencies when reading data from slower storage devices by reading more data than is necessary to fill a request by a processor. This is based on the assumption that the data requested by the processor at some future time will be among the extra data read by the cache system, and that the cache system will be able to fill that future request for data more quickly.

Cache systems typically intercept requests for data from a storage device, and supply the data if the requested data is stored within the cache. If some or all of the data is not in the cache, then the data not already in the cache is requested from the storage device. In cases where data must be requested from the storage device, the cache system will often request what is often referred to as a "block" of data large enough to fill one or more cache lines of the cache. Where possible, the effects of the latencies of the storage device are often minimized by supplying data needed to fill the original request for data from the storage device at the same time that data is read from the storage device to fill one or more cache lines.

Such cache systems have proven to be effective for processors in many systems due to common patterns in the amount and quantities a processor typically requires in requests for data. However, peripheral devices within a computer system often have very different patterns of access, and often require much larger and highly variable quantities of data when requesting data from a storage device.

SUMMARY OF THE INVENTION

An apparatus and method for predicting quantities of data required by requesting devices in future requests for data from storage devices, in which patterns of quantities requested in past requests for such data are monitored. Predictions are made based on those patterns, then associated with a pattern, and then used to make requests for data from storage devices, and are selectively modified if they prove to be inaccurate.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The example embodiments of the present invention are described in the context of devices retrieving data in a burst read transfer from a random access memory (RAM) storage device. However, the present invention is applicable to a variety of types of data transfers between a variety of devices. The present invention could be used with other types of transfer operations. Furthermore, storage devices other than RAM may be used with the present invention.

Figure 1:
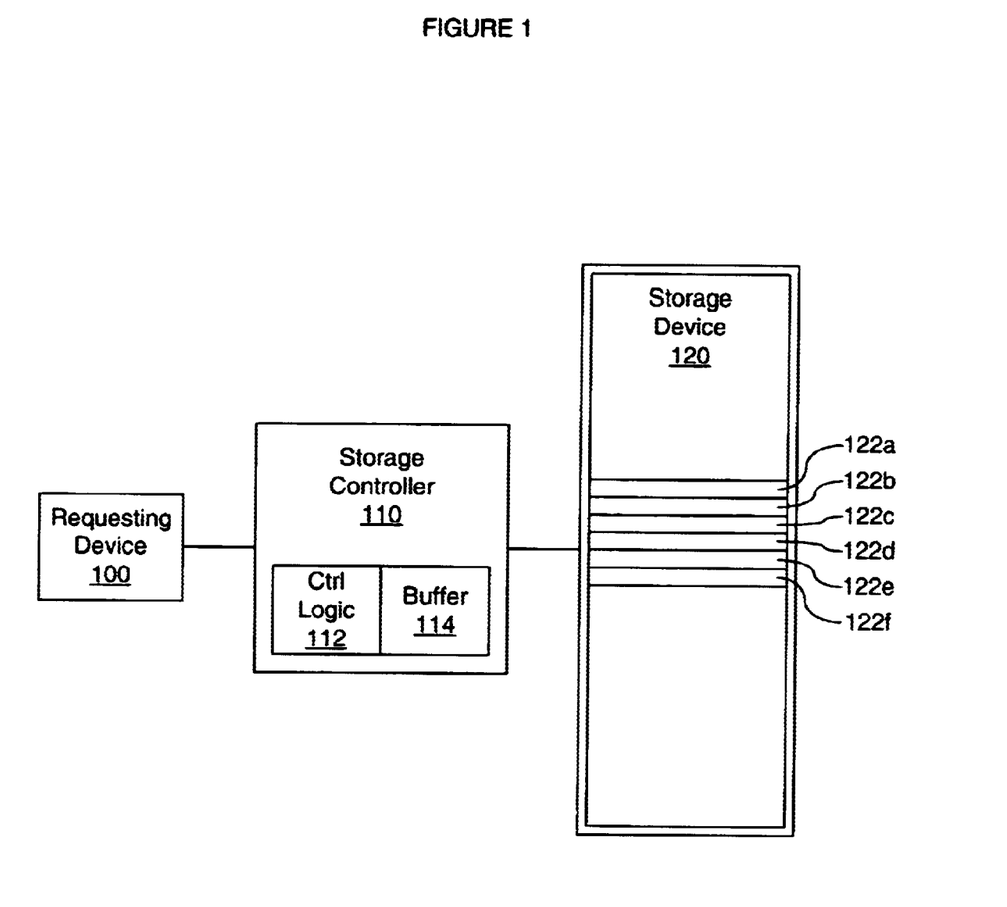
FIG. 1 is a simplified block diagram of one embodiment of a storage controller.
Figure 5:
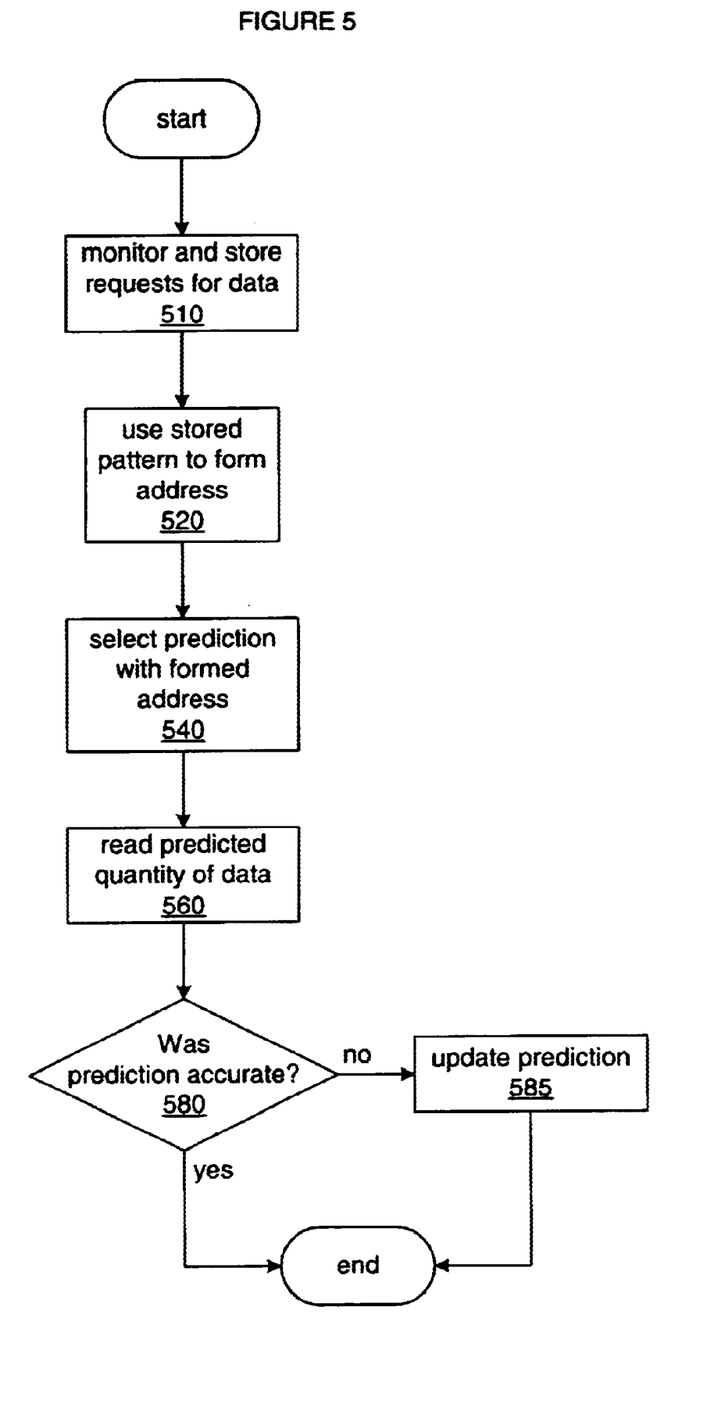
FIG. 5 is a flow diagram according to one embodiment of the invention.

FIG. 1 depicts one embodiment of a storage controller, and FIG. 5 depicts a flow chart that could correspond to an embodiment of FIG. 1. Storage controller 110 includes control logic 112 and buffer 114 and is coupled to both requesting device 100, a device capable of initiating a request for data from a storage device, and storage device 120. Storage controller 110 provides requesting device 100 with access to storage locations within storage device 120, including storage locations 122a through 122f. In commonly available computer systems, storage device 120 is a dynamic random access memory or DRAM, and storage locations 122a through 122f are byte-addressable memory locations. However, storage device 120 could also be another form of RAM or a disk storage device such as a hard disk. Storage locations 122a through 122f could be addressable memory locations of some other size or configuration than byte-addressable, or if storage device 120 is disk storage device, storage locations 122a through 122f could be addressable as tracks, sectors or logical blocks.

Control logic 112 monitors requests made by requesting device 100 for data from storage device 120 at 510. The quantities of data requested by requesting device 100 in the last few requests for data are retained at 510 by control logic 112 and used together as a pattern to make predictions of how much data will be requested in the next request for data that will be made by requesting device 100. These predictions are based on the assumption that requesting device 100 will have a repeating pattern of quantities of data required in any given series of requests for data, and therefore, a pattern of quantities of data required in the last few requests will be followed by a predictable quantity in the next request. Different storage locations within buffer 114 correspond to different patterns of quantities of data for previous burst read transfers. For simplicity of logic design, these predictions may be ranges of quantities of data.

Buffer 114 is used by control logic 112 to store associations of patterns of quantities of data required in previous requests for data and predictions of the quantity of data that will be required in the next request. In response to a request for data, control logic 112 uses the pattern of previous quantities of data requested to select a prediction value to be used in making a request for data from storage device 120. Buffer 114 also stores accuracy values providing a measure of accuracy of the prediction. Where the predictions are ranges of quantities of data, control logic 112 may request the maximum quantity of data within that range from storage device 120 in an effort to minimize the effects of the latencies of storage device 120.

Requesting device 100 signals storage controller 110 with a request to read data from storage location 122a within storage device 120. If the pattern of previous quantities of data requested by requesting device 100 indicates that requesting device 100 will follow this request with another request for more data from adjacent storage locations within storage device 120, then control logic 112 will request data from location 122a and perhaps adjacent locations 122b up to 122f, depending upon the amount of additional data that past patterns would indicate. As the data is read from storage device 120 at 560, it is stored in another part of buffer 114. The additional data beyond what was requested by requesting device 100 is retained in buffer 114, to be provided to requesting device 100 if the prediction proves accurate and the additional data is later requested by requesting device 100.

However, if the pattern of previous quantities of data requested by requesting device 100 indicates that requesting device 100 will not follow the current request with another request for more data from adjacent storage locations within storage device 120, then control logic 112 will request data from location 122a, only.

To minimize the effects of the latencies of storage device 100, the data requested by requesting device 100 may be provided to requesting device 100 to satisfy the current request at the same time that data is still being read from storage device 120 for storage in buffer 114.

The accuracy of each of the predictions stored in buffer 114 is determined by monitoring the storage locations within buffer 114 where data requested from storage device 120 in addition to the data requested by requesting device 100 are kept. If, in a subsequent request, requesting device 100 requests none of the additional data, or requests a quantity that is less than the minimum value of a range of quantities predicted or less than an exact quantity predicted, then the prediction is deemed to be too large. If requesting device 100 makes a request for data that falls within the range of quantities predicted or which exactly matches the quantity of additional data, then the prediction is deemed to be accurate at 580. If requesting device 100 makes a request for data that includes the additional data, but also requires still more than the additional data, because the request is for a quantity larger than the range of predicted quantities or larger than an exact quantity predicted, then the prediction is deemed to be too small. After the new request is made, and the prediction has been found to be inaccurate at 580 such that it should be modified at 585, control logic 112 stores the modified prediction into the same storage location in buffer 114 from which the prediction value was originally read in response to the earlier request in which the additional date was stored in buffer 114. Control logic 112 may also stores an accuracy value indicating a measure of accuracy of prediction.

In one embodiment, if the prediction used in the current transfer proved to be inaccurate, the prediction would be immediately modified and stored in buffer 114, as just described. In another embodiment, an accuracy value specifying a measure of accuracy would also be used in making the prediction for the next request. In this embodiment, this accuracy value is used to insert a delay or "hysteresis" in changes made to the prediction value. In this embodiment, the modification of prediction values is delayed such that a prediction value must be determined to be inaccurate more than once, and in the same way (i.e., too large versus too small), before the prediction value will be modified. Such a delay is used to ensure that the modification of prediction values does not occur in response to anomalous quantities of data being requested, time to time, by requesting device 100. On the first occasion of an inaccuracy, the accuracy value is modified to reflect the occurrence. On a subsequent occurrence of a similar inaccuracy, the prediction value is then modified, and the accuracy value is then also modified to indicate a presumed improvement in accuracy as a result of the modification of the prediction value. Table 1, below, illustrates one set of "rules" by which prediction values may be modified, and what kind of accuracy value would be stored with a prediction.

TABLE 1

| current accuracy value stored in buffer | how accurate the prediction turned out to be | how prediction value will be modified | what the accuracy value will be modified to reflect |
| --- | --- | --- | --- |
| too low | too low | increased by 1 | just right |
| too low | just right | unmodified | too low |
| just right | too low | unmodified | too low |
| just right | just right | unmodified | just right |
| too low | too high | unmodified | just right |
| too high | too low | unmodified | just right |
| just right | too high | unmodified | too high |
| too high | just right | unmodified | too high |
| too high | too high | decreased by 1 | just right |

It will be understood by those skilled in the art that the implementation of a delay could entail storing and using more than one accuracy value, and the delay may be such that more than 2 occurrences of an inaccuracy is required for a modification of a prediction value to occur.

Although, in this embodiment, data read from storage device 120 is temporarily stored in buffer 114, along with predictions and accuracy values, it will be understood that data read from storage device 120 could be stored in a separate buffer, or cache, not shown.

In one embodiment where there are additional requesting devices (not shown), control logic 112 would store separate sets of predictions and accuracy values for each requesting device, and would make separate prediction values for each. However, in another embodiment with multiple requesting devices, control logic 112 would store one set of predictions and accuracy values, and would make one set of predictions. In one embodiment, control logic 112 would maintain and use separate patterns for each requesting device, though a pattern could be maintained for all requesting devices.

Figure 2:
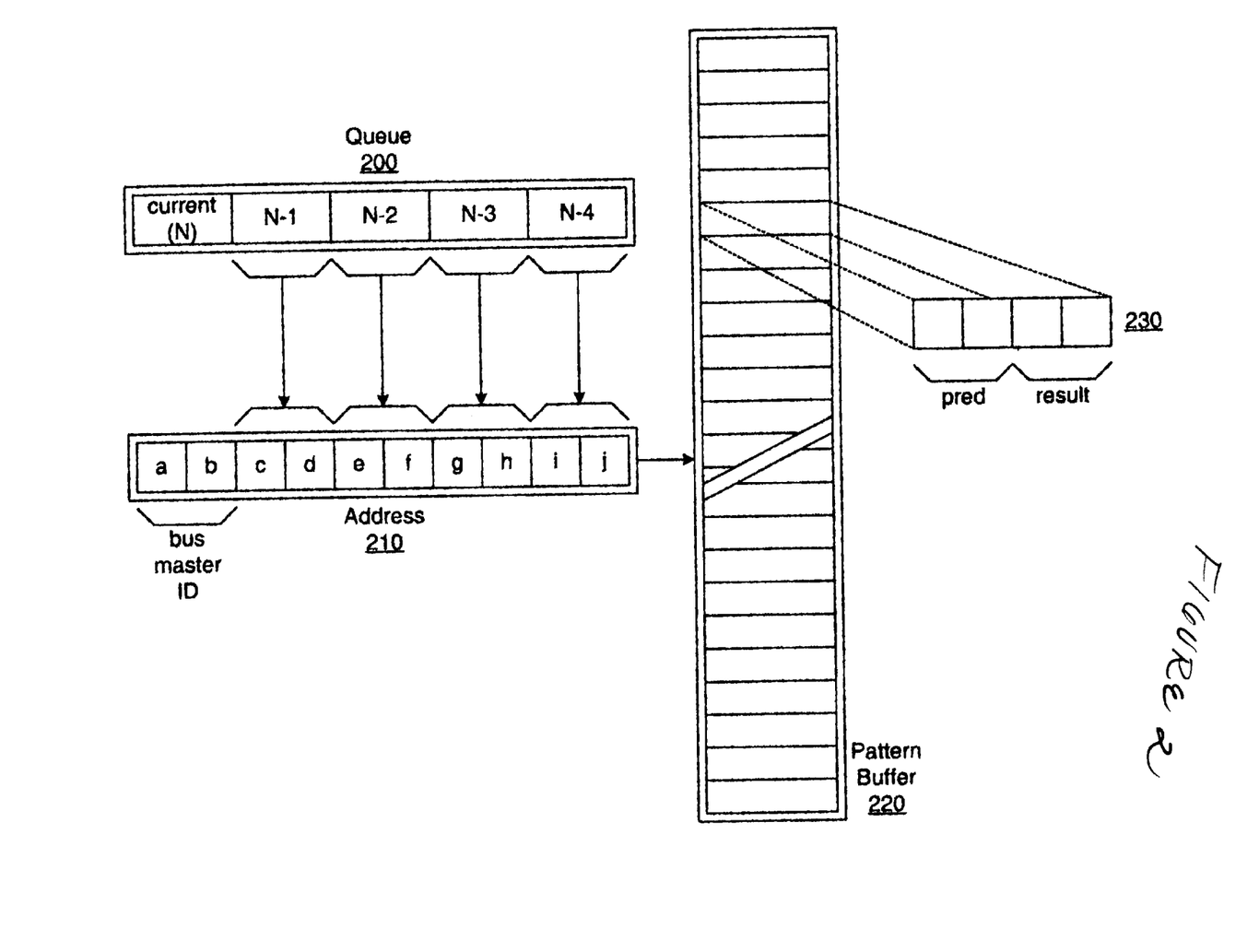
FIG. 2 is a simplified block diagram of one embodiment of a method for predicting quantities of data that will be requested in future requests for data.

FIGS. 2 and 5 depict an embodiment of a method predicting quantities of data required from a storage device. In this embodiment, 2-bit binary values are used to specify ranges of quantities of data actually requested or predicted to be required. As will be understood by those skilled in the art, varying numbers of bits corresponding to any of a number of values or ranges of values may be used. In this embodiment, binary values 0 through 3 correspond to ranges of quantities of bytes as depicted in Table 2, below.

TABLE 2

| | |
|---|---|
| 00 | 1 to 2 cache lines |
| 01 | 3 to 4 cache lines |
| 10 | 5 to 8 cache lines |
| 11 | 9 or more cache lines |

It will be understood by those skilled in the art that the number of bits used to specify quantities of date, as well as the quantities or ranges of quantities that each combination of bits specifies, can be made programmable. In this embodiment, 2-bit values are also used to specify a measure of accuracy of a prediction. Again, it will be understood by those skilled in the art that varying numbers of bits corresponding to various accuracy. values may be used. In this embodiment, binary values 0 through 2 correspond to various measures of accuracy, as depicted in Table 3, below.

TABLE 3

| | |
|---|---|
| 00 | prediction too low |
| 01 | within range |
| 10 | prediction too high |
| 11 | no meaning assigned |

It will be understood that the number of bits used to provided a measure of accuracy, as well as the measured that each combination of bits specifies, can be made programmable.

Queue 200 is divided into 5 storage locations, each of which is 2 bits in size. Position N stores 2 bits indicating the actual quantity of bytes of data requested by a requesting device in a current request. Positions N-1 through N-4 each store 2 bits indicating the quantities of data requested in the last 4 requests for data, with position N-1 being the most recent of those requests, and position N-4 being the least recent. Taken together, positions N-1 through N-4 describe the pattern of quantities of data requested over the last 4 request. Queue 200 is used in a manner analogous to a FIFO (first-in-first-out) buffer, although the physical implementation of queue 200 could take many forms, as will be readily understood by those skilled in the art. At 510, as each new request for data from a storage device (not shown) is filled, the 2 bits representing the quantity of bytes requested in the new request are then placed in position N, and the data that was in position N is shifted to position N-1, and so on through the positions of queue 200, with the data that was in position N-4 being discarded. In this way, the quantity of data requested in the current request becomes part of the pattern that will be used when in response to a future request.

Pattern buffer 220 is used to store predictions of quantities of data for the next request that may occur after each possible pattern, along with accuracy values providing a measure of the accuracy of each prediction. Pattern buffer 220 includes 1024 storage locations, each of which is 4 bits, or 1 nibble in width. Storage location 230 is representative of these storage locations, with a 2-bit prediction value and a 2-bit accuracy value.

Address 210 is used in selecting storage locations within pattern buffer 220 to access predictions and accuracy values. As shown, the 2-bit values indicating the quantities of data requested in the last 4 requests for data are used to form part of address 210. In the depicted embodiment, 2 additional bits that identify 1 of up to 4 requesting devices also form part of address 210. The use of quantities of data requested in creating addresses for selecting storage locations within pattern buffer 220 is a way of matching the pattern of quantities requested in the last 4 requests to a prediction and an accuracy value. In this embodiment, a separate queue 200 is maintained for each requesting device. However, in another embodiment, a single set of data for predictions and accuracy values are maintained for all requesting devices. In such an embodiment, pattern buffer 220 would also be smaller, requiring 256 storage locations to store data representing predictions and accuracy values, instead of 1024 storage locations. Furthermore, in still other embodiments, there may be only one queue 200 used to maintain a pattern for all requesting devices, regardless of whether or not separate sets of prediction and accuracy values are maintained. It will also be understood that the number of positions in queue 200 may be implemented so as to be programmable, allowing larger or smaller patterns to be maintained.

When a request is received from a requesting device for data from a storage device, the 2-bit values in positions N-1 through N-4 are used, along with the 2-bit value identifying the requesting device, to create address 210 at 520. Address 210 is used to select the storage location within pattern buffer 220 that corresponds to the pattern of quantities requested in the last 4 requests at 540. As previously discussed, the prediction value from the selected storage location within buffer 220 is used in requesting data from a storage device, including data in addition to that which was actually requested by the requesting device, if it is predicted that the additional data will be requested in a subsequent request at 560. The bits in the positions of queue 200 are then shifted such that the bits in position N are moved to position N-1, the bits in position N-1 are moved to position N-2, and so on throughout queue 200, with the bits in position N-4 being discarded. In this way, the pattern of quantities requested now includes a quantity value at N-1 for this latest request. If, at a later time (at 580), either the prediction or accuracy value is to be modified, then at 585 the modified values are written to the same storage location within pattern buffer 220 that was originally selected by address 210. At that time, address 210 may be recreated or retrieved from a storage of associations between that address and the data read from the storage device in anticipation of a future request.

Figure 3:
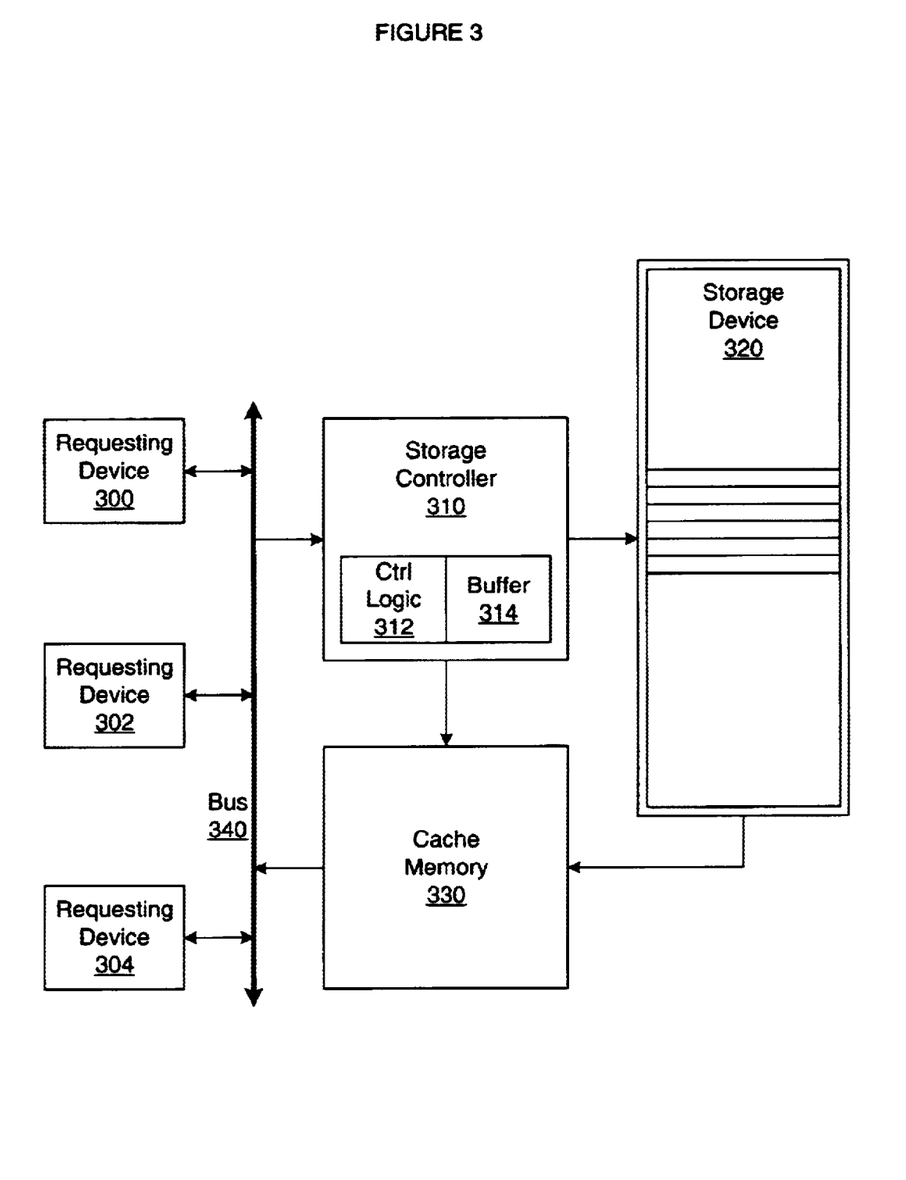
FIG. 3 is a simplified block diagram of another embodiment of a storage controller.

FIG. 3 depicts another embodiment of a storage controller. Bus 340 couples requesting devices (devices capable of initiating a request for data from a storage device) 300, 302 and 304 to storage controller 310 and cache memory 330. Storage controller 310 includes control logic 312 and buffer 314, and provides access from bus 340 to data stored in storage device 320. Cache memory 330 receives data read from storage device 320 in answer to requests for data, and provides that data on bus 340 where it can be received by devices coupled to bus 340, including requesting devices 300, 302 and 304.

When one of requesting devices 300, 302 or 304 makes a request for data stored in storage device 320, control logic 312 uses the pattern of previous requests for data made by the requesting device that is making the current request to retrieve a prediction of how much data should be requested from storage device 320 to fill the current request and a possible future request for data that may be received from the same requesting device. Control logic 312 then makes a request of storage device 320 for an amount of data corresponding to the predicted amount, and as this data is read from storage device 320, it is stored in storage locations in cache memory 330. The storage locations in cache memory 330 are commonly referred to as cache lines. The cache lines within cache memory 330, in addition to storing data read from storage device 320, also store bits associating the address of the storage location within buffer 314 from which the prediction was retrieved that was used in reading the data from storage device 320 that filled each cache line. Alternatively, storage locations within buffer 314 would be used to maintain these associations. These associations may be for individual cache lines, or may be for a plurality of cache lines associated as a set of cache lines with the single prediction. As data stored in cache lines of cache memory 330 are provided on bus 340 in answer to requests from requesting devices on bus 340, the association of predictions to cache lines actually read is used to determine the accuracy of each prediction, and to select the prediction to be modified, if necessary.

The cache lines of cache memory 330 are typically of a predetermined size, such as 64 bytes. Data requested from storage device 320 may or may not be a multiple of 64 bytes in size. However, whenever storage device 320 is accessed to provide data to fill cache lines within cache memory 330, enough data is often read to fill the entire cache line, regardless of how small a portion of that data is actually part of the data originally requested. Often, the data requested may be enough to fill multiple cache lines, and may even be enough to fill more cache lines than are either present in the cache or which have been allocated for use in any single transfer or for any single requesting device. Such limits on the number of cache lines, if not based on physical limitations of the design of the cache memory, may be programmable, allowing for optimization by software, possibly to accommodate specific requesting devices.

In determining the accuracy of the prediction, a count would be made of the number of cache lines associated with a given prediction that are subsequently accessed in supplying data in answer to a future request for data. As data was read from storage device 320 to fill cache lines, it is assumed that the data will have been read from adjacent storage locations within storage device 320 in sequential order. Similarly, it is assumed that in a future request for data that is provided from the cache lines, that the cache lines will be accessed and read in an order corresponding to the sequential order in which the data therein was read from storage locations within storage device 320.

Where the predicted quantity is a range of quantities where some or all of the quantities in the range may be more than can be accommodated with available cache lines, either due to limits in the size or physical configuration of the cache memory, or due to limits in the allocation of cache lines per request or per requesting device, available cache lines may be used in a "FIFO-like" manner in which cache lines are filled with data from storage device 320 as they are accessed to supply data to a requesting device. Where possible, the filling of cache lines would take place soon enough after being read to supply data to a requesting device to minimize or "hide" the latencies incurred in reading data from storage device 320. This would also be done where a range was "open-ended" as in the case of the fourth range of "9 or more cache lines" specified in Table 2. In such cases, the FIFO-like use of cache lines would continue until either the requesting device indicated that it required no more data, or until a known quantity required by the requesting device had been reached. Alternatively, the FIFO-like use of cache lines may proceed beyond known required quantities of data in a speculative manner, anticipating still more data being required by possible continuation of the current request for data or the occurrence of a future request.

Figure 4:
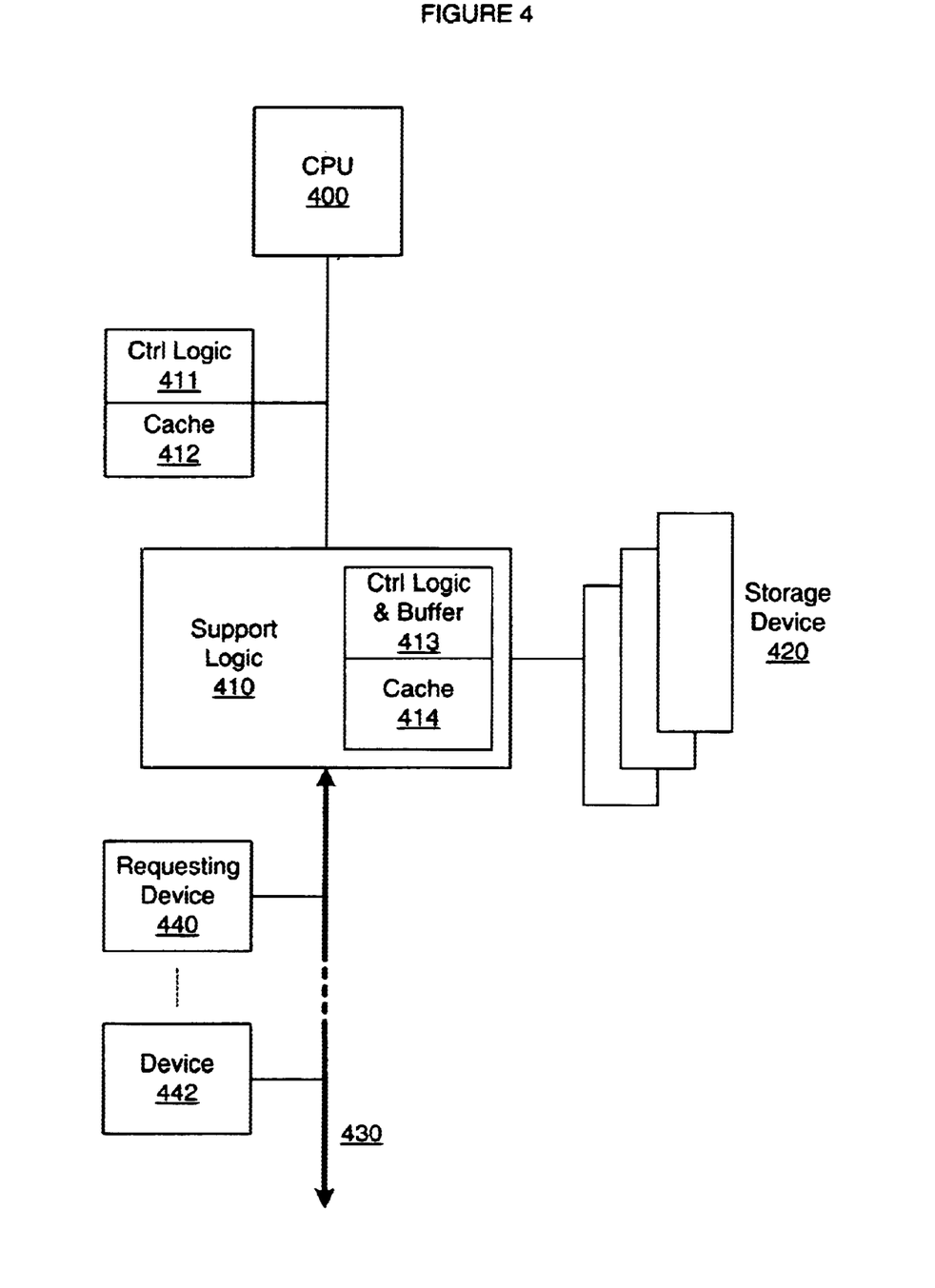
FIG. 4 is a simplified block diagram of a computer system.

FIG. 4 depicts an embodiment of a computer system. The depicted computer system includes CPU 400, coupled to cache 412 and accompanying control logic 411, along with support logic 410. Support logic 410 is also coupled to storage device 420 and bus 430 Support logic 410 also includes control logic 413 and cache 414, generally used in transfers of data from storage device 420 to devices coupled to bus 430. Control logic 413 includes a buffer (not shown). Cache 412 and accompanying control logic 411 are generally used in transfers of data from storage device 420 to CPU 400. Requesting device 440, and optionally, additional devices such as device 442 are coupled to bus 430.

Storage device 420 is typically, but not necessarily, a random access memory or RAM used by the computer system for the storage of programs and/or data. Bus 430 supports a form of burst transfer whereby a starting address in a storage device from which data is to be read or into which data is to be written is first specified, along with the quantity of data to be read or written, followed by multiple transfers of data, either from or to a storage device. However, as will be understood by those skilled in the art, bus 430 could be implemented to support wide variety and differing combinations of types of transfers.

Control logic 413 receives a request from requesting device 440 to read data from storage device 420, the quantity and starting address of which are supplied by requesting device 440. Control logic 413 responds by signaling requesting device 440 to temporarily suspend the request. While the request is suspended, bus 430 is available for transfers of data to and from other devices, such as device 442. Control logic 413, accesses cache 414 to obtain a prediction of the amount of data that requesting device 440 will request in a future request for data from storage locations in storage device 420 that are adjacent to the storage locations from which data is currently being requested. Control logic 413 then requests a quantity of data from storage device 420 large enough to fill both the current request and a future request (if the prediction indicates that there will be such data requested), starting at the address supplied by requesting device 440. The data received from storage device 420, in response to the request made by control logic 413, is stored in cache 414 at storage locations within cache 414 that are associated with the prediction just used by control logic 413 to request the data. Control logic 413 signals requesting device 440 that to proceed with the transfer of data to requesting device 440 across bus 430. The data collected in cache 414 is transmitted across bus 430 to requesting device 440, thus filling the current request.

If requesting device 440 makes a further request for only the cache lines within cache 414 where the additional data was stored while the last request was being filled, then the prediction will be deemed accurate. However, if the not all the cache lines filled while the last request was being filled are accessed, or a request is made for the additional data along with still more data, then the prediction will be deemed inaccurate. If data beyond what is present in cache lines within cache 414 must be read from storage device 420, then where possible, data will be provided from cache lines within cache 414 to requesting device 440 while data is also being read from storage device 420. Control logic 413 may repeatedly suspend a current request long enough to allow more data to read from storage device 420 to fill cache lines within cache 414.

Control logic 413 is configured to implement a delay in refining predictions to counteract the effects of occasional anomalous quantities of data being requested by a requesting device. If the prediction was found to be inaccurate only once, then control logic 413 will modify the accuracy value and store the modified accuracy value. However, if the prediction was found to be inaccurate more than once, with the accuracy value indicating previous inaccuracy in the same way (i.e., too small vs. too large), then control logic 413 will modify the prediction to refine it and modify the accuracy value to mark the new prediction as accurate, and store both in cache 414.

It will be understood by those skilled in the art that the accuracy and prediction values could be initialized to values chosen to be optimal for specific bus master devices, or to other values. Such initialization could be carried out by software such as device drivers. In one embodiment, device drivers specific to each bus master device installed in a computer system would initialize accuracy or initialization values, as desired, as each device driver is initialized. Furthermore, it will be understood that the number of quantities used to make up a pattern may also be made programmable, and may be similarly initialized by software.

In one embodiment, requesting device 440 is the only device on bus 430 capable of initiating requests for data from storage device 420. In another embodiment, however, device 442 is also capable of initiating such requests. In such an embodiment, control logic 413 may treat the monitoring of patterns of quantities of data for each device, separately, and may maintain separate sets of predictions for each device. In a further embodiment in which there is another bus (not shown) in addition to bus 430, separate control logic (not shown) may be used to monitor patterns of quantities of data requested from storage device 420 from one or more requesting devices coupled to the other bus.

It is evident that numerous alternatives, modifications, variations and uses will be apparent to those skilled in the art in light of the foregoing description.

It will be understood by those skilled in the art, that the present invention may be practiced in support of other combinations of functions in a display system in addition to or in lieu of texture mapping and/or motion compensation where the pre-fetching of pixel data is effective to differing degrees.

What is claimed is:

1. A method, comprising:
   storing a first pattern of quantities of data requested from a data storage device made by a requesting device capable of requesting data from the storage device;
   forming at least part of an address from the first pattern of requested quantities of data to select a prediction of a quantity of data to be requested from the storage device when a second pattern of requested quantities of data matches the first pattern;
   reading a quantity of data indicated by the selected prediction from the data storage device in preparation for supplying data predicted to be requested by the requesting device; and
   selectively modifying the selected prediction if the selected prediction proves to be inaccurate.

2. The method of claim 1, wherein the selected prediction is modified after two or more occasions in which the selected prediction proves to be inaccurate.

3. The method of claim 2, further comprising forming at least part of an address from a pattern of requested quantities of data to select an indicator of past occasions in which a prediction proved to be inaccurate.

4. The method of claim 1, wherein separate first patterns, second patterns and predictions are maintained for each requesting device among a plurality of requesting devices.

5. The method of claim 1, wherein separate first patterns, second patterns and predictions are maintained for each bus by which a requesting device receives the data requested.

6. An apparatus, comprising:
   a first buffer to store a first pattern of quantities of data requested from a data storage device made by a requesting device capable of requesting data from the storage device;
   control logic to form at least part of an address from the first pattern of requested quantities of data to select a prediction of a quantity of data to be requested from the storage device when a second pattern of requested quantities of data matches the first pattern;
   a second buffer to store a quantity of data indicated by the selected prediction and read from the data storage device in preparation for supplying data predicted to be requested by the requesting device; and
   control logic to selectively modify the selected prediction if the selected prediction proves to be inaccurate.

7. The apparatus of claim 6, wherein a prediction is modified after two or more occasions in which the prediction proves to be inaccurate.

8. The apparatus of claim 7, further comprising control logic to form at least part of an address from a pattern of requested quantities of data to select an indicator of past occasions in which a prediction proved to be inaccurate.

9. The apparatus of claim 6, wherein separate first patterns, second patterns and predictions are maintained for each requesting device among a plurality of requesting devices.

10. The apparatus of claim 6, wherein separate first patterns, second patterns and predictions are maintained for each bus by which a requesting device receives the data requested.

11. The apparatus of claim 6, wherein the apparatus is incorporated into logic controlling a cache memory in a computer system.

12. The apparatus of claim 11, wherein the cache memory caches data read from the storage device for peripheral devices in the computer system.

13. The apparatus of claim 6, wherein the first and second buffers are portions of a single buffer.

14. A computer system, comprising:
   at least one CPU;
   at least one storage device;
   at least one requesting device coupled to the storage device and capable of initiating a request for data from the storage device; and
   prediction logic to predict the quantity of data that will be requested in a future request for data from the storage device by a requesting device based on patterns of quantities of data requested from the storage device by that requesting device.

15. The computer system of claim 14, wherein an address is formed using a pattern of quantities of data requested by a requesting device to select a prediction from among a plurality of predictions.

16. The computer system of claim 14, wherein a prediction is modified after two or more occasions in which the prediction proves to be inaccurate.

17. The computer system of claim 16, wherein an address is formed using a pattern of quantities of data requested by a requesting device to select an indicator of past occasions in which the prediction proved to be inaccurate from among a plurality of indicators.

18. The computer system of claim 14, wherein separate associations of patterns and predictions are maintained for each requesting device among a plurality of requesting devices.

19. The computer system of claim 14, wherein separate associations of patterns and predictions are maintained for each bus by which a requesting device receives the data requested.

20. The computer system of claim 14, wherein the prediction logic is incorporated into a cache memory.

21. The computer system of claim 20, wherein the cache memory caches data read from the storage device for peripheral devices in the computer system.

22. The computer system of claim 14, wherein patterns are stored in a buffer that is also used to temporarily store the data requested by the requesting device.

* * * * *

UNITED STATES PATENT AND TRADEMARK OFFICE
CERTIFICATE OF CORRECTION

PATENT NO. : 6,625,696 B1  Page 1 of 1
DATED : September 23, 2003
INVENTOR(S) : Willke, II It is certified that error appears in the above-identified patent and that said Letters Patent is hereby corrected as shown below:

Column 3,
Line 60, delete "date", insert -- data --.

Column 5,
Line 9, delete "date", insert -- data --.
Line 25, delete "provided", insert -- provide --.
Line 26, delete "measured", insert -- measures --.
Line 37, delete "request", insert -- requests --.

Signed and Sealed this

Sixteenth Day of December, 2003

JAMES E. ROGAN
*Director of the United States Patent and Trademark Office*